United States Patent
Shaffer et al.

(10) Patent No.: US 6,532,218 B1
(45) Date of Patent: Mar. 11, 2003

(54) SYSTEM AND METHOD FOR MULTIMEDIA COLLABORATIVE CONFERENCING

(75) Inventors: Shmuel Shaffer, Palo Alto, CA (US); William J. Beyda, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/286,265

(22) Filed: Apr. 5, 1999

(51) Int. Cl.[7] .............................................. H04L 12/28
(52) U.S. Cl. ...................................... 370/260; 709/204
(58) Field of Search ................................ 709/204, 213; 370/260; 348/14.04; 725/82, 114, 115, 116, 117

(56) References Cited

U.S. PATENT DOCUMENTS

| | | | | |
|---|---|---|---|---|
| 5,568,183 A | * | 10/1996 | Cortjens et al. | ......... 348/14.05 |
| 5,721,842 A | * | 2/1998 | Beasley et al. | ................. 345/4 |
| 5,793,415 A | * | 8/1998 | Gregory et al. | ............ 348/14.1 |
| 5,796,440 A | * | 8/1998 | Rupinski et al. | ............ 348/476 |
| 5,812,185 A | * | 9/1998 | Mizuno et al. | ............ 348/14.09 |
| 5,841,763 A | * | 11/1998 | Leondires et al. | ....... 348/14.08 |
| 5,956,076 A | * | 9/1999 | Hoess | ........................ 725/118 |
| 5,999,966 A | * | 12/1999 | McDougall et al. | ...... 348/14.09 |
| 6,151,621 A | * | 11/2000 | Colyer et al. | ................. 345/2.1 |
| 6,198,558 B1 | * | 3/2001 | Graves et al. | ............. 359/119 |
| 6,211,869 B1 | * | 4/2001 | Loveman et al. | ........... 345/723 |
| 6,249,324 B1 | * | 6/2001 | Sato et al. | ............... 348/14.08 |
| 6,259,443 B1 | * | 7/2001 | Williams, Jr. | ............... 345/716 |
| 6,346,964 B1 | * | 2/2002 | Rogers et al. | ........... 348/14.03 |

* cited by examiner

*Primary Examiner*—Melvin Marcelo
*Assistant Examiner*—Derrick W Ferris (57) ABSTRACT

A conferencing server (22) and methods for use with a videoconferencing system (20) for multimedia collaborative conferencing. The conferencing server (22) includes at least two data ports (69) and at least two video graphics input ports (67), each pair of data and video graphics input ports for connecting to one of at least two computers (72) belonging to a participant located in a local videoconference room. The conferencing server (22) also includes a single video graphics output port (77) for connecting to a local input port (40) of the videoconferencing system (22). The conferencing server (22) includes a control unit (50) that is selectively programmed to couple a first of the at least two video graphics input ports (67) to the video graphics output port (77) for allowing the transfer of information from the computer connected to the first of the at least two video graphics input ports to the videoconferencing system (20). In specific embodiments, the video graphics input and output ports are SVGA input and output ports.

3 Claims, 7 Drawing Sheets

SYSTEM AND METHOD FOR MULTIMEDIA COLLABORATIVE CONFERENCING

BACKGROUND OF THE INVENTION

This invention relates to videoconferencing systems, and more particularly, to an apparatus and method that provide videoconferencing systems with multimedia collaborative conferencing.

Videoconferencing systems are becoming commonly used to conduct meetings between participants who are geographically separated. With such a videoconferencing system, an audio and video signal are transmitted over a telephonic link to be reproduced at a remote videoconferencing system so that parties can see and hear each other. Oftentimes, such a videoconferencing system can also provide video signals other than those which provide an in-room camera view, such as signals that provide a document camera view or a Super Video Graphics Array (SVGA) view input from a user's laptop.

Currently, when an individual using the video conferencing system wishes to make a computer-based presentation, such as by using POWERPOINT® slides, the individual plugs his or her laptop in the SVGA input of the video conferencing system. This allows the individual to visually present the slides to other members of the video conference in addition to or as an alternative to providing the typical video connection of the conference room. The video conferencing system can also be used merely those within a single room in order to visually present the slides to an audience within that room. In either scenario, the other participants of the conference can view and comment on a presenter's slides.

However, this videoconferencing system also has several disadvantages. First, if a conference participant has a question about one of the slides, the presenter may have to toggle back through the slides to reach the pertinent slide. This can often waste a significant amount of the presenter's time. Furthermore, if another participant in the conference room wishes to make a presentation, the initial presenter must manually remove his laptop from the SVGA input on the videoconferencing system in order to permit the second presenter access to the SVGA input.

As a result, a need exists for an apparatus and method that provides users of a videoconferencing system with a more convenient and efficient way of making presentations and that further enhances the quality of the videoconference.

SUMMARY OF THE INVENTION

To improve the convenience and efficiency of videoconferences, this invention provides a conferencing server that interfaces with a local videoconferencing system and with multiple computers in the local conference room in order to control which of the computers has immediate access to the videoconferencing system. In particular, the conferencing server includes at least two data ports and at least two video graphics input ports. Each pair of data and video graphics input ports is connected to one of the computers, each of which is associated with a participant located in a local videoconference room. The data ports provide a data connection while the video graphics ports provide a video graphics connection. The conferencing server also includes a video graphics output port that is connected to a local video input port on the videoconferencing system. Even further, the conferencing server includes a control unit that is selectively programmed to identify and couple one of the two video graphics input ports to the video graphics output port in order to permit the transfer of information between the computer that is connected to the identified video graphics input port and the videoconferencing system. The video graphics input and output ports may be SVGA ports in some specific embodiments.

The control unit is also programmed to receive and process various requests transmitted from the computers to the data ports of the conferencing server. One example of a request is to connect the video graphics input port coupled to the requesting computer to the video graphics output port. In this regard, the control unit is further programmed to queue multiple such requests as only one video graphics input port can be coupled to the video graphics output port at any given time. Another example of a request handled by the control unit is a request from a participant to ask a question to another participant who is currently delivering a document to the videoconferencing system for presentation thereon. Upon receiving such a request and upon approval by the presenting participant, the control unit then toggles control of the video graphics output port to the participant having the question, e.g., for the purposes of pointing to a previous slide.

Finally, the control unit is programmed to store a copy of documents or slides transmitted to the videoconference system and to permit retrieval of such documents or slides by any of the computers connected to the conferencing server.

DETAILED DESCRIPTION OF THE SPECIFIC EMBODIMENTS

The present invention provides a conferencing server that interfaces with a videoconferencing system and moderates who among multiple users controls a video graphics output port of the conferencing server. It should be noted that the specific embodiments discuss video graphics output and input ports that are SVGA ports, but in other embodiments, other types of video graphics ports may be used.

As will be described in more detail below, the conferencing server interfaces with multiple computers, each associated with a local participant of the conference. The server controls which of these participants has immediate access to the SVGA output port of the conferencing server, which in turn interfaces with the videoconferencing system. In addition, the conferencing server permits the local participants who do not have control of the SVGA output port to have access to a shared version of the current presentation for displaying locally on their computers. Therefore, the conferencing server permits the local participants to review the presentation without disrupting the presenter or the visual display of the presentation on a monitor of the videoconferencing system. Finally, the conferencing server of the present invention monitors which of the local participants has a question for the presenter and toggles control of the SVGA output port to the questioner upon approval by the presenter.

Figure 1:
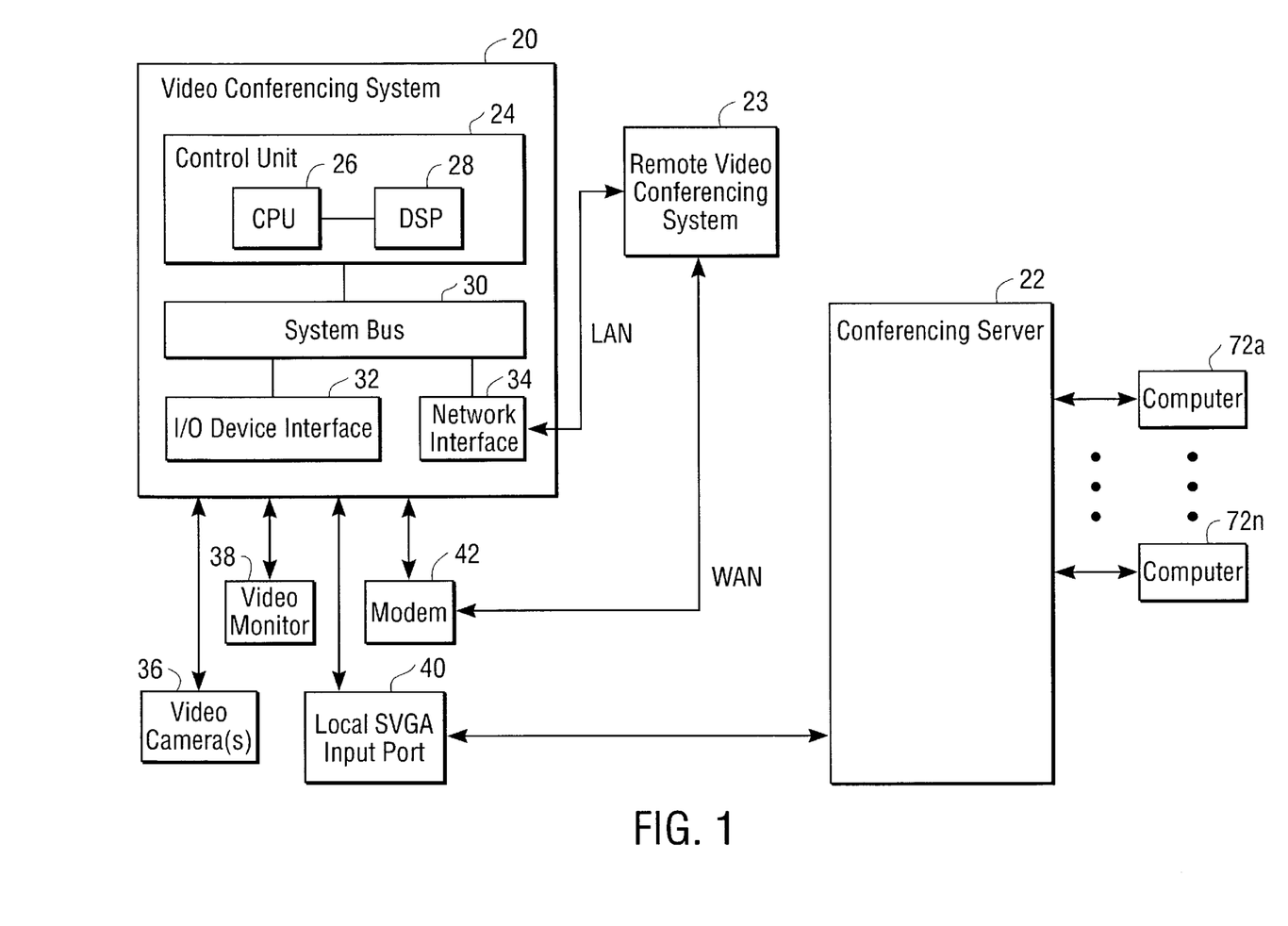
FIG. 1 is a block diagram of a conferencing server according to the present invention connected to a typical videoconferencing system.

FIG. 1 illustrates a local videoconferencing system 20 that transmits and receives telephone and video signals to and from a remote videoconferencing system 23. Local video conferencing system 20 also interfaces with a conferencing server 22 that is coupled to multiple computers 72a–72n, in accordance with the present invention. The local videoconferencing system 20, as depicted in FIG. 1, includes a control unit 24 that contains a central processing unit (CPU) 26 and a digital signal processor (DSP) 28 as well as numerous buttons and keys that are pressed by a user in order to operate the local videoconferencing system 20. Generally, the CPU 26 is responsible for setting up conference calls and the DSP 28 is responsible for making analog-to-digital or digital-to-analog data conversions of the audio and video signals. These audio and video signals are transmitted between the local and remote videoconferencing systems over a wide area network (WAN) via a system bus 30, input/output device interface 32, and a modem 42; or over a local area network (LAN) via the system bus 30 and a network interface 34.

The control unit 24 sends and receives signals to and from a video camera or cameras 36, a video monitor 38, and the modem 42. The video camera 36 has a microphone and records both visual and audio activity in a conference room in which the local videoconferencing system 20 is located. The video monitor 38 reproduces the video and audio signals received from the remote videoconferencing system 23. Alternatively, separate devices for recording audio activity in the local videoconference room or for listening to the audio activity from a remote videoconference room can be provided, such as microphones and speakers.

In addition, the control unit 24 sends and receives signals to and from the conferencing server 22 via a local SVGA input port 40 of the conference system. In prior art systems, the local SVGA input port 40 is connected via a cable to a user's laptop where the user can deliver a computer-based visual or audio presentation to the remote videoconferencing system 23 and/or to the local video monitor 38 or yet another video monitor in the local videoconferencing system 20. It will be appreciated by those skilled in the art and others that the videoconferencing system 20 depicted in FIG. 1 is merely exemplary and many changes can be made thereto. For example, another video camera for providing a document view can be connected to the I/O device interface.

It will also be appreciated by those skilled in the art and others that the local videoconferencing system 20 can be connected to the remote videoconferencing system 23 or other remote videoconferencing systems using a variety of technologies, including standard ISDN lines or by providing telephony-over-LAN (ToL) conferences over a company intranet or even the Internet.

Figure 2:
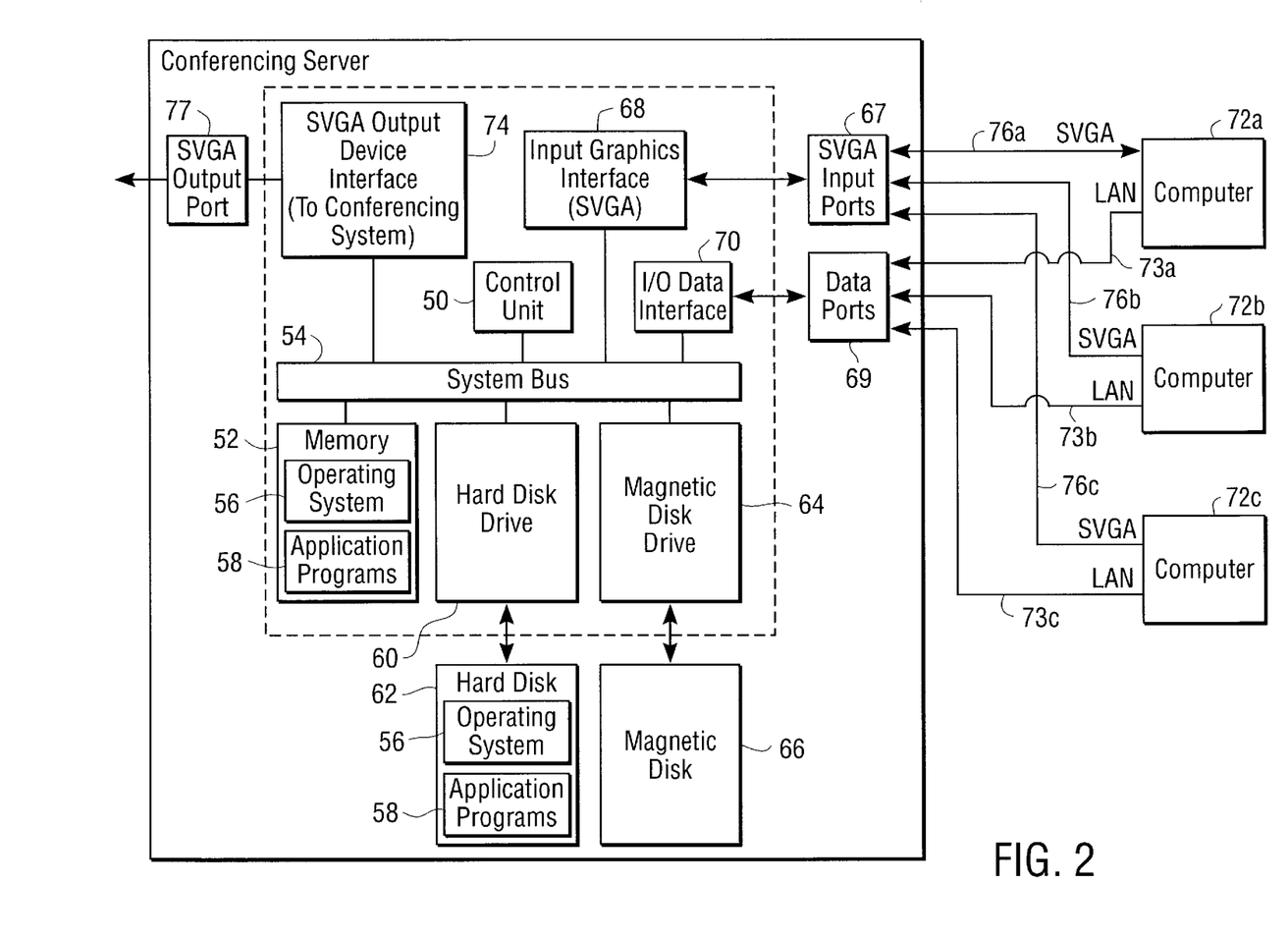
FIG. 2 is a block diagram of the conferencing server of FIG. 1 in accordance with this invention.

FIG. 2 illustrates the conferencing server 22 depicted in FIG. 1 in further detail. The conferencing server 22 includes a control unit 50 that contains a CPU (not shown), a system memory 52, and a system bus 54 that couples various system components including the system memory 52 to the control unit 50. The conferencing server 22 further includes a hard disk drive 60 for reading from and writing to a hard disk 62 and a magnetic disk drive 64 for reading from or writing to a removable magnetic disk 66. The drives and their associated computer-readable media provide non-volatile storage of computer-readable instructions, data structures, application modules, and other data for the conferencing system 22. In this regard, a number of application modules may be stored on the hard disk 62, magnetic disk 66, or the system memory 52, including an operating system 56 or one or more application programs 58.

It will be appreciated by those skilled in the art and others that the conferencing server 22 may include an optical disk drive (not shown) for reading from or writing to a removable optical disk (also not shown), such as a CD ROM or other optical media. It will be further appreciated by those skilled in the art that other types of computer-readable media which can store data that is accessible by a computer, such as magnetic cassettes, flash memory cards, digital video disks, random access memories (RAMs), read-only memories (ROMs), and the like, may also be used in the conferencing server.

The conferencing server 22 also includes at least two SVGA input ports 67 and at least two data ports 69 that are coupled to the system bus 54 of the conferencing server via an input graphics interface 68 and an input/output data interface 70, respectively. Each of the SVGA input ports 67 provides an SVGA connection 76 to an SVGA output of a computer 72. Likewise, each of the data ports 69 provides a data connection 73, preferably a LAN or Ethernet data connection, to which a data output from the computer 72 is coupled.

FIG. 2 illustrates the conferencing server 22 interfaced with three computers 72a, 72b, and 72c, and thus, the conferencing server 22, as illustrated in this example, has three SVGA input ports for providing three SVGA connections 76a, 76b, and 76c, each to one of the three computers 72a, 72b, or 72c. Similarly, the conferencing server 22, as illustrated, has three data ports for providing three data connections 73a, 73b, and 73c, each to one of the three computers 72a, 72b, or 72c. It will be appreciated by one skilled in the art and others that the conferencing server can be provided with any number of SVGA input ports and data ports for connecting any number of computers thereto.

Although the conferencing server 22 provides at least two SVGA input ports 67, it only provides a single SVGA output port 77 which is connected to the system bus 54 via an SVGA output device interface 74, in accordance with the specific embodiment of the invention (in other embodiments, it is possible that multiple output ports may be provided, with control for each output port being allocated in accordance with the principles of the present invention). The SVGA output port 77 serves to couple the output of the conferencing server to a video input of the local videoconferencing system 20. As will be better understood from the following description, this allows only one of the participants in the local conference room, each of whom have a computer 72 connected to the conferencing server 22, to seize control of the SVGA output port of the conferencing server at any given time. In addition, only one participant at a time may deliver documents from their computer 72 to the videoconferencing system 20 for display on the video monitor 38 or for transmission to the remote videoconferencing system 23. Although only one participant via their computer has control of the SVGA output port 77 at any given time, the conferencing server 22 stores information received from the computers on the system memory 52 which is, in turn, accessible by all computers connected to the conferencing server. Therefore, all remaining participants in the local conference room have access to a shared version of the presentations transmitted to the videoconferencing system 20.

Figure 3:
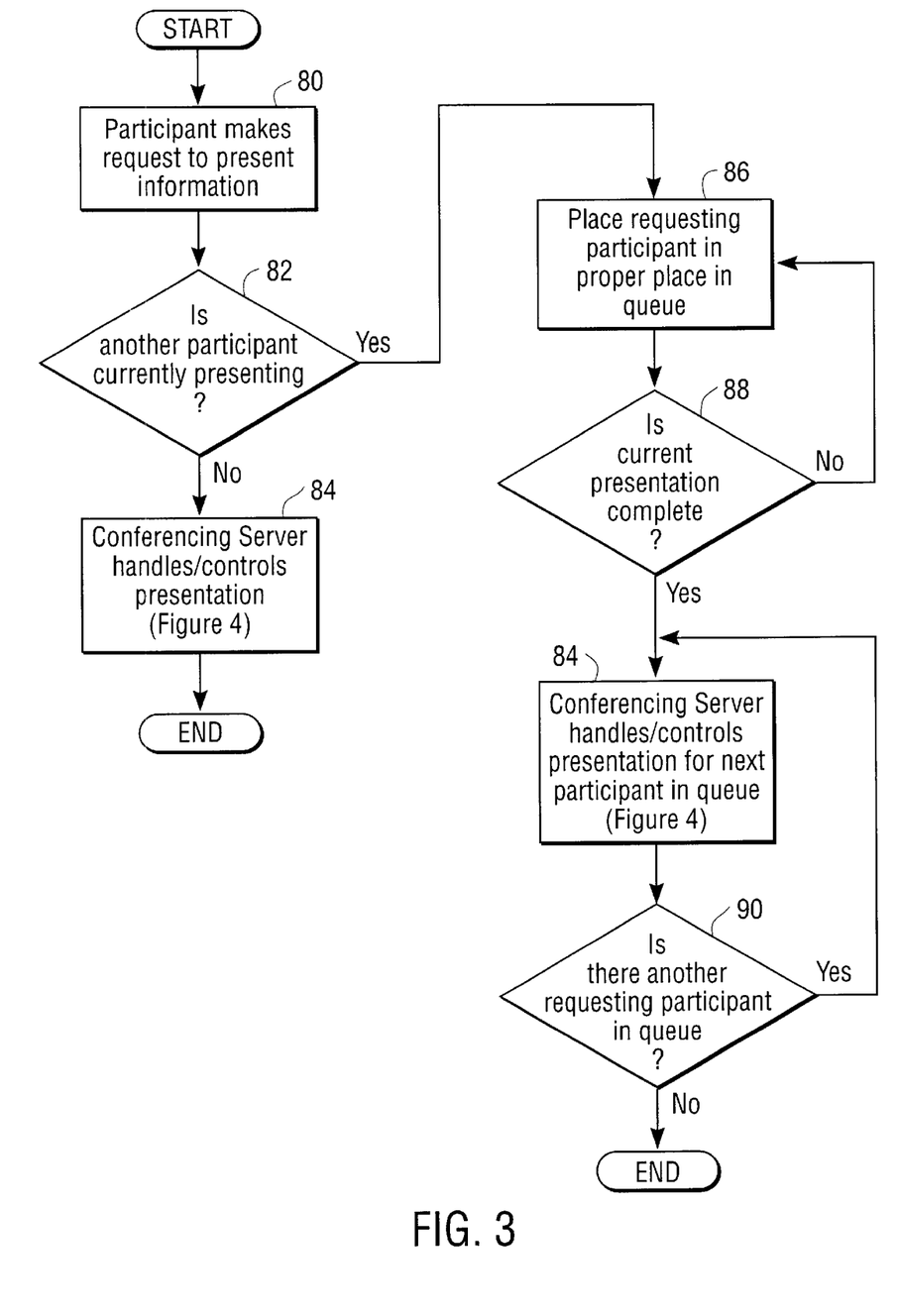
FIG. 3 is a flow diagram that illustrates the functionality provided by the conferencing server depicted in FIG. 2 for determining which participant has control of the SVGA output port of the conferencing server for making a presentation.

FIG. 3 is a flow chart that illustrates the steps performed by the conferencing server 22 of the present invention to determine which participant has control of the SVGA output port in order to make a presentation on the videoconferencing system. In addition, it illustrates how the conferencing server queues other participants located in the local conference room who also request to make such a presentation. With reference to FIGS. 3–7, the steps that are identified as being performed by the conferencing server are more specifically accomplished by its control unit 50, which is programmed accordingly.

Returning to FIG. 3, beginning with a step 80, a local conference room participant makes a request to the conferencing server 22 to present information. This request can be made by, for example, clicking on a "present" icon which is provided by special client software running on each of the computers 72. The request is sent to the conferencing server 22 from the participant's computer 72 over the data connection 73.

Then, at a step 82, a test is made by the conferencing server 22 to determine whether another participant is currently making a presentation. If another participant is not currently making a presentation, the conferencing server 22 then handles the presentation of the requesting participant at a step 84, which will be described in further detail in FIG. 4. On the other hand, if another participant is currently making a presentation and thus has control of the SVGA output port of the conferencing server, the conferencing server 22 places the requesting participant in the proper place in a queue at a step 86. In one embodiment, the conferencing server 22 places the requesting participant in the queue on a first-in first-out basis. Alternatively, under the direction of a moderator, the conferencing server can place the requesting participant at any designated location of the queue.

Next, a test is made at a step 88 by the conferencing server to determine whether the current presentation has been completed. If it has not been completed, the conferencing server 22 continues to make this query as shown in FIG. 3 until it determines that the current presentation has been completed. Once the conferencing server 22 determines that the current presentation has been completed or if it originally makes this determination, the conferencing server 22 then handles a next presentation for the next participant in the queue at step 84.

At a step 90, after the conferencing server 22 has handled the prior presentation and thus after the prior presenter has lost control of the SVGA output port of the conferencing server, a test is made by the conferencing server 22 to determine whether there is yet another participant in the queue requesting to make a presentation. If the answer to step 90 is yes, processing returns to step 84 as shown in FIG. 3, and the steps described above are repeated. By repeating these steps, the conferencing server 22 permits each requesting participant in the queue to make a presentation over the videoconferencing system 20. On the other hand, if the answer to step 90 is no, meaning that no user is waiting to present, the process ends.

It will be appreciated by one skilled in the art and others that the conferencing server is always monitoring whether a request to present information is being made. At any time such a request is made, the requesting participant enters the flow diagram of FIG. 3 at step 80.

As mentioned above, FIG. 4 illustrates in more detail how the conferencing server 22 controls a presentation by a requesting participant. First, at a step 96, the conferencing server 22 connects the SVGA input port of the conferencing server to which a requesting participant's computer is connected as the local video input to the videoconferencing system 20. As a result, this requesting participant, now the current presenter, can display a presentation, both locally in the local videoconference room and remotely in remote videoconference rooms through the videoconference system 20.

Figure 4:
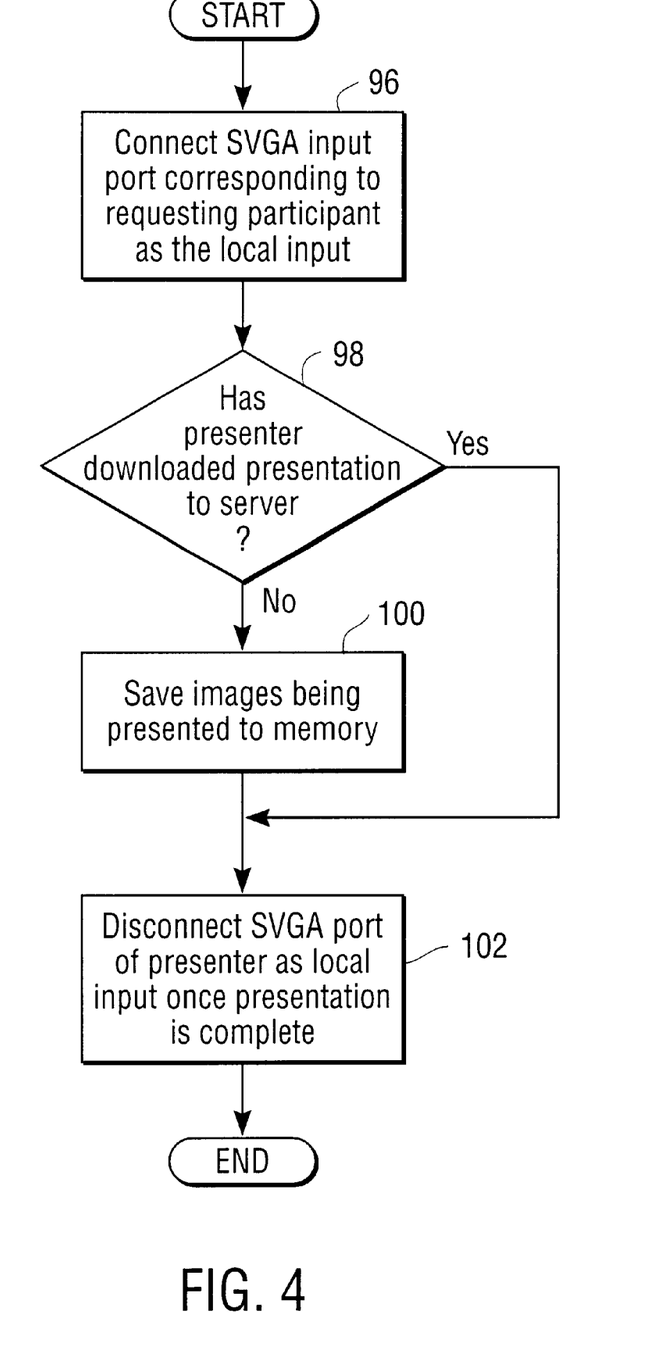
FIG. 4 is a flow diagram that illustrates the functionality provided by the conferencing server depicted in FIG. 2 for controlling a presentation by a specific participant.

Next, a test is made by the conferencing server, at a step 98, to determine whether the current presenter has transferred a copy of their presentation from the connected computer 72 to the hard disk 62 of the conferencing server over the data connection 73. This transfer can be initiated by software running on each of the computers 72, which allows for the identification of and transfer of the appropriate file to the conferencing server. If the presenter does not download their presentation to the conferencing server at step 98, the conferencing server saves an image of every slide being presented in its system memory 52 or its hard disk 62 at a step 100. This is accomplished by software running on the conferencing server that captures images received from active SVGA input ports.

On the other hand, if the presenter in fact downloaded their presentation to the server at step 98, there is no need for the conferencing server to save an image of every slide being presented. In either situation, i.e., whether the presenter downloaded their presentation to the conferencing server or whether the server saved the images being presented, the presentation is available for downloading from the conferencing server by other participants over the data connection 73, which will be further described below with reference to FIG. 5.

Returning to FIG. 4, once the presentation has ended, the conferencing server 22 disconnects the SVGA input port that is connected to the computer of the presenter from the SVGA output port of the conferencing server at a step 102. Thus, this presenter no longer has access to the local video input port 40 of the videoconferencing system 20. In practice, the presenter will send a message to the conferencing server via data connection 73 indicating that the presentation is complete by, for example, clicking a "presentation complete" icon on the presenter's computer.

Figure 5:
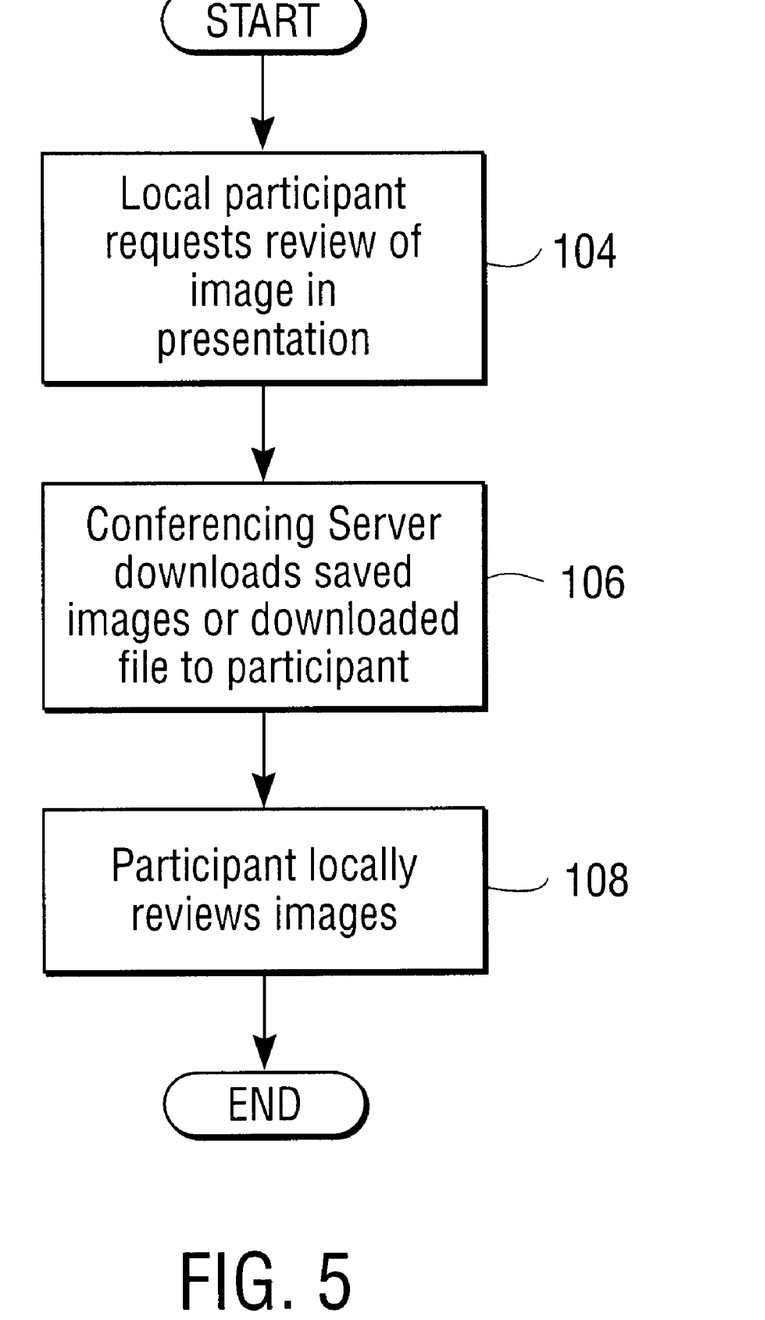
FIG. 5 is a flow diagram that illustrates the functionality provided by the conferencing server depicted in FIG. 2 for allowing participants to locally review a presentation.

As discussed above, the conferencing server 22 stores a copy of the images being presented in the conference whether the presenter downloaded these images or whether the conferencing server itself saves the images. At any time during a presentation, any local participant whose computer is connected to the conferencing server so as to provide a data connection can have access to this stored presentation. In this regard, FIG. 5 illustrates how a participant acquires a copy of the images being displayed in the presentation over the videoconferencing system from the conferencing server 22.

Beginning at a step 104, a local participant sends a request to the conferencing server to review an image in the presentation via software provided on their computer 72. For example, a local participant may need to send such a request if the presenter goes over a slide too quickly. In order to send the request, the requesting participant can, for example, hit a "back" button on client software running on their computer 72 which sends a command to the conferencing server 22 over the data connection 73 requesting a copy of the last image presented. Then, at a step 106, the image is transmitted by the conferencing server to the computer 72 of the participant requesting the information. The participant can now locally review the image or file on their computer at a step 108.

It will be appreciated by those skilled in the art and others that any number and variety of buttons can be provided on client software running on the computers 72 for requesting access to the presentation or for manipulating a downloaded file or image. As an example of further requests that can be made by a presenter and responded to by the conferencing server, the participant may hit a "forward" button to catch up to the main presentation after reviewing the material requested above. The forward button sends a command over the data connection 73 to the conferencing server to bring up the next page.

Alternatively, if the participant reviewing the information is several pages behind the current presentation, a quicker "return to current" button can be offered to similarly bring up the current page of the presentation. However, if the presenter downloaded their entire file to the conferencing server 22, a button can be provided on the computers 72 that permits participants to request the entire file from the conferencing server for review locally on their computers. Additional software buttons can be provided on the client computers for toggling through the images in the file locally and independently from the presentation being given.

Figure 6:
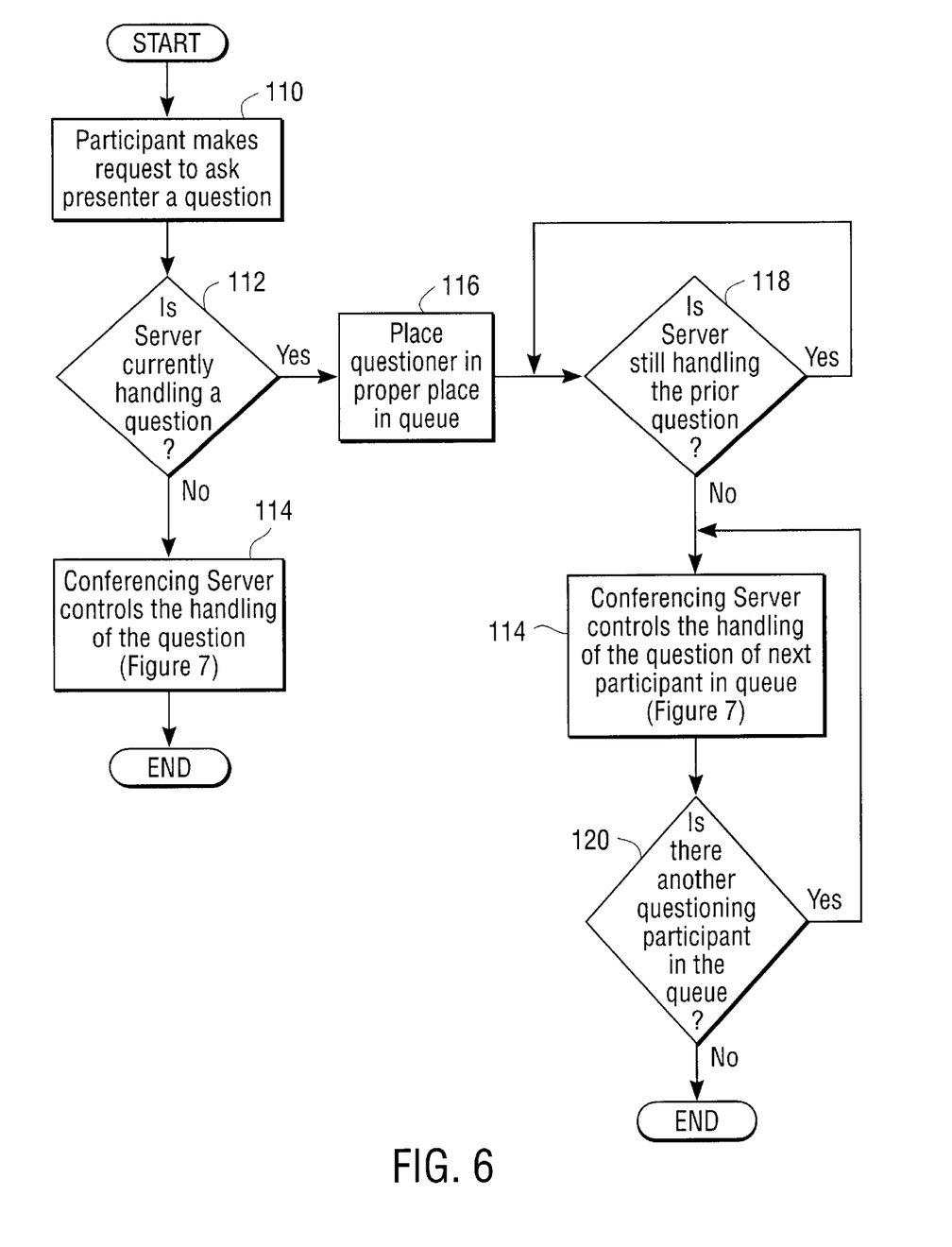
FIG. 6 is a flow diagram that illustrates the functionality provided by the conferencing server depicted in FIG. 2 for queuing participants having questions for a current presenter.

Besides allowing conference participants to make presentations and to locally review such presentations, the conferencing server 22 also controls the handling of a question as illustrated in FIG. 6. Beginning at a step 110, a local participant makes a request to the conferencing server 22 to ask the presenter a question. This request can be made by, for example, clicking on a "question" button which is provided by special client software running on each of the computers 72. This action causes the request to be transmitted to the conferencing server 22 from the questioning participant's computer 72 over the data connection 73.

As will be described in more detail below, the questioning participant by sending this request to the conferencing server is seeking to briefly take control of the SVGA output port of the conferencing server for the purpose of asking a question about a particular slide displayed by the presenter. Thus, before sending the request to the conferencing server, the participant should first back up to the slide to which the question pertains to display it locally on their personal computer 72. By doing this, if the participant immediately gains control of the SVGA output port, the appropriate slide is immediately displayed. Of course, in addition to sending the request, the questioning participant may also want to get the attention of the presenter through conventional means.

Then, returning to FIG. 6, a test is made to determine whether the conferencing server is currently handling a question at a step 112. If the answer to step 112 is no, the conferencing server 22 proceeds to control the handling of the new question at a step 114. How the conferencing server controls the handling of the question is described in further detail with reference to FIG. 7 below. If the answer to step 112 is yes, the conferencing server places the questioning participant in the proper place in a queue at a step 116. In one embodiment, the conferencing server 22 places the questioning participant in the queue on a first-in first-out basis. Alternatively, under the direction of a moderator or the presenter, the conferencing server can place the questioning participant at any designated location of the queue.

Next, a test is made at a step 118 by the conferencing server to determine whether the prior question is still being handled, i.e., whether the prior questioning participant still has control of the SVGA output port of the conferencing server. If it is still being handled, processing returns to step 118 until the question is complete. If the conferencing server has finished handling the prior question, it then controls the handling of the next question of the next participant in the queue at step 114.

Once the conferencing server has handled the question of the next participant in the queue, a test is made at a step 120 to determine if there is yet another questioning participant in the queue. If the answer to step 120 is yes, the processing returns to step 114, and the steps described above are repeated. By repeating these steps, the conferencing server effectively handles the control of each question in the queue. If the answer to step 120 is no, meaning that no participants have any questions, processing ends.

It will be appreciated by one skilled in the art and others that the conferencing server is always monitoring whether a request to ask a question is being made. At any time such a request is made, the questioning participant enters the flow diagram of FIG. 6 at step 110.

Figure 7:
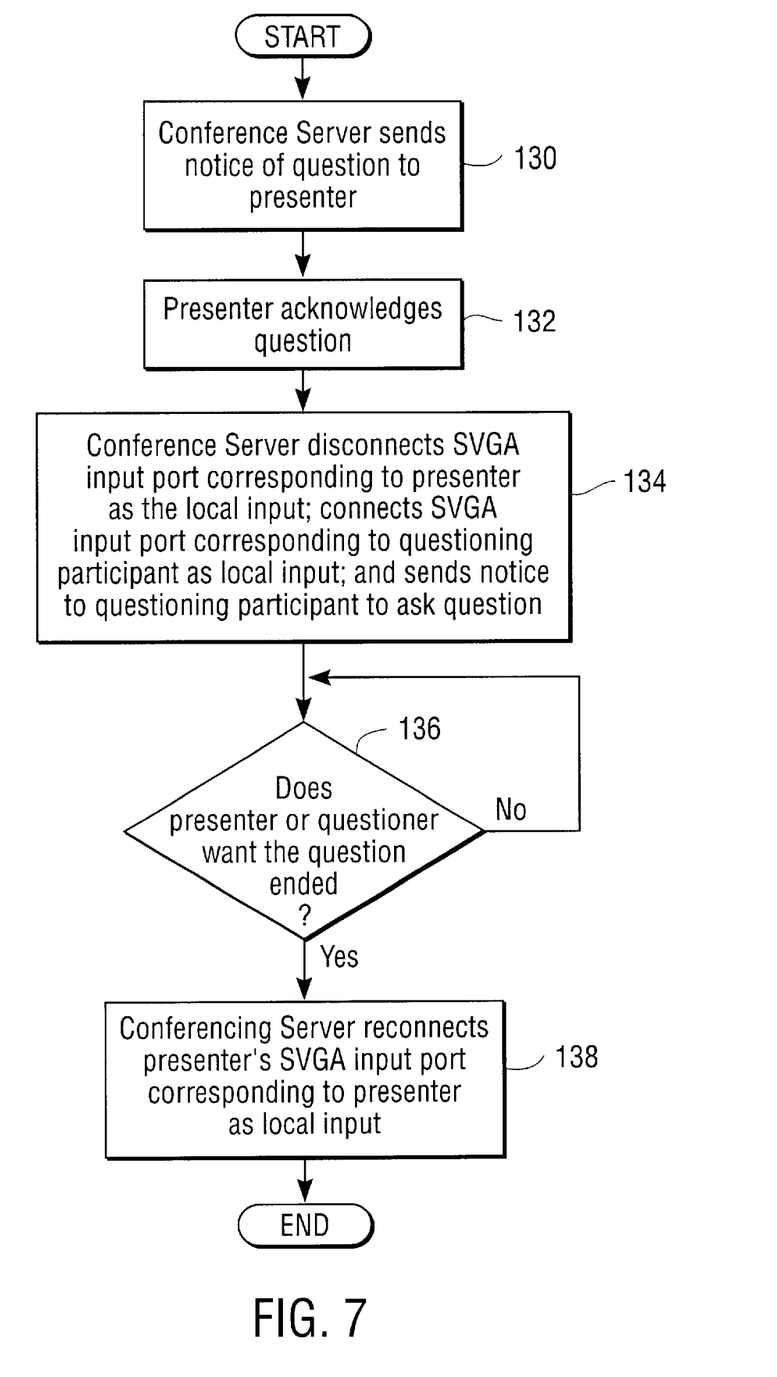
FIG. 7 is a flow diagram that illustrates the functionality provided by the conferencing server depicted in FIG. 2 for controlling the handling of a question.

FIG. 7 illustrates in more detail how the conferencing server 22 controls the handling of a question. First, at a step 130, the conferencing server 22 sends a notice of the question to the current presenter's computer 72 via the corresponding data connection 73. This notice may, for example, be a "participant question" icon that appears on the computer of the presenter. Then, at a step 132, the presenter acknowledges the question by, for example, clicking on the "participant question" icon which sends a message from their computer 72 to the conferencing server over the data connection 73 indicating that the presenter is ready for the question and thus agrees to briefly relinquish control of the SVGA output port of the conferencing server.

Next, at a step 134, the conferencing server disconnects the SVGA input port connected to the presenter's computer 72 from the SVGA output port and connects the SVGA input port connected to the questioning participant's computer 72 to its SVGA output port. In addition, the conferencing server sends a notice over the data connection 73 corresponding to the questioning participant's computer to signal the participant that they now have control of the SVGA output port for asking their question. Then, the questioning participant can ask their question and can even have previously drawn, or interactively draw, comments on the slide, such as arrows or lines, for all participants in the conference room to view.

Alternatively, instead of simultaneously connecting the SVGA input port corresponding to the questioning participant's computer and sending the notice to the questioning participant, the conferencing server can first send a similar notice to questioning participant and await confirmation via the data connection 73 before connecting the SVGA input port connected to the questioning participant's computer to the SVGA output port.

Next, at a step 136, a test is made to determine whether either the presenter or the questioning participant wants the control of the SVGA output port of the conferencing server to return to the presenter. The conferencing server can be notified of such a desire by either the presenter or the questioner. Such a notice may be transmitted by hitting, for example, an "end question" button on their computer, which sends a signal to the conferencing server over the appropriate data connection 73. If the answer to step 136 is no, the conferencing server 22 continues to make this query until such time that the questioning participant relinquishes or the presenter requests to regain control of the SVGA output port. On the other hand, if the answer to step 136 is yes, the conferencing server reconnects the SVGA input port that is connected to the presenter's computer as the main feed to the SVGA output port at a step 138. Thus, the presenter's computer is reconnected to the videoconferencing system.

As will be readily appreciated by those skilled in the art and others, a conferencing server formed in accordance with this invention has a number of advantages. First, by using a conferencing server having a SVGA output port that provides the local video input to the videoconferencing system and that controls multiple SVGA input ports that are connected to multiple computers, the conferencing server can be used with any existing videoconferencing system that has an SVGA input port. Thus, the existing videoconferencing system infrastructure for interconnecting various conferencing sites can remain in place.

Furthermore, by using a conferencing server that can toggle control of the connection to its SVGA output port between various SVGA input ports each of which are connected to a computer, it allows multiple participants in a collaborative conference room to seize control of the document delivery mechanism to either present or to interject slides as required without requiring users to manually connect and disconnect their computers to the local video input of the existing videoconferencing system.

Finally, by providing data connections to the conferencing server as well as SVGA connections for each of the computers in the conference room, the conferencing server allows everyone access to a shared version of a presentation to locally review on their computers. Therefore, the conferencing server and methods of the present invention provide for a more convenient and efficient videoconference, either locally within a single room having multiple participants or with respect to a multi-site videoconference.

What is claimed:

1. A conferencing server for routing video signals from a plurality of computers to a video conferencing system, comprising:

a plurality of data ports for providing a data connection with the plurality of computers;

a plurality of video input ports for receiving video signals from the plurality of computers:

a single active video output port that provides video signals from a presenting computer to a video input of the video conferencing system;

a memory at stores video signals received from the presenting computer; and a processor programmed to receive a request from a request computer other than the presenting computer to cease providing video signals from the presenting computer to the single active video output port and to begin providing video signals from the requesting computer to the single active video output port.

2. The conferencing system of claim 1, wherein the processor is programmed to allow the requesting computer to retrieve a stored display from the memory of the conferencing server and to alter the stored display prior to the display being provided by the requesting computer to the single active video output port.

3. The conferencing computer of claim 1, wherein the processor is programmed to receive a signal from the requesting computer to again supply video signals received from the presenting computer to the single active video output port.

* * * * *